Dec. 7, 1937.  E. B. MOORE  2,101,445
AUTOMATIC CONSTANT HEAT ELECTRIC SOLDERING IRON
Filed June 21, 1934
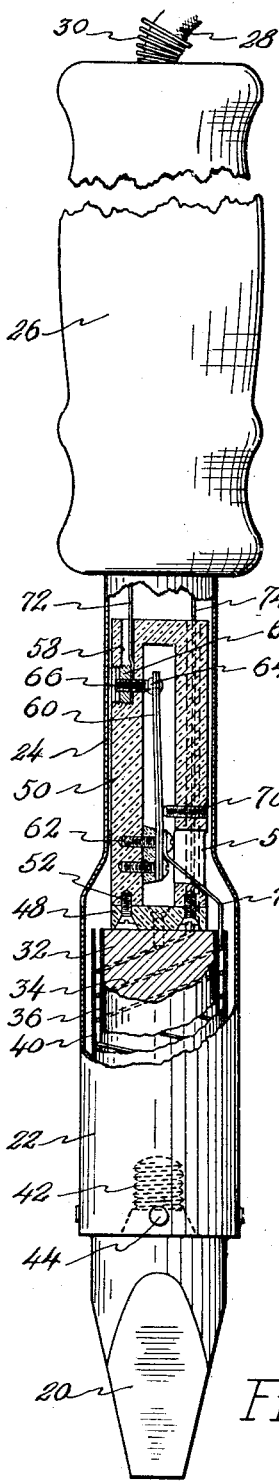
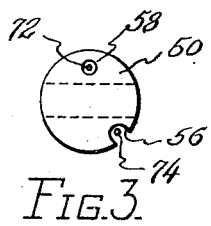
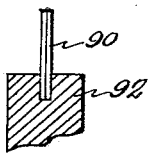
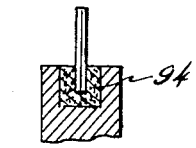
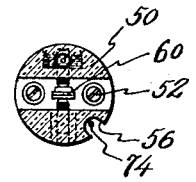
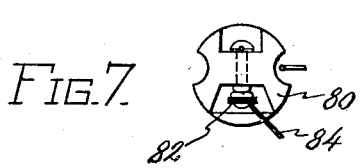
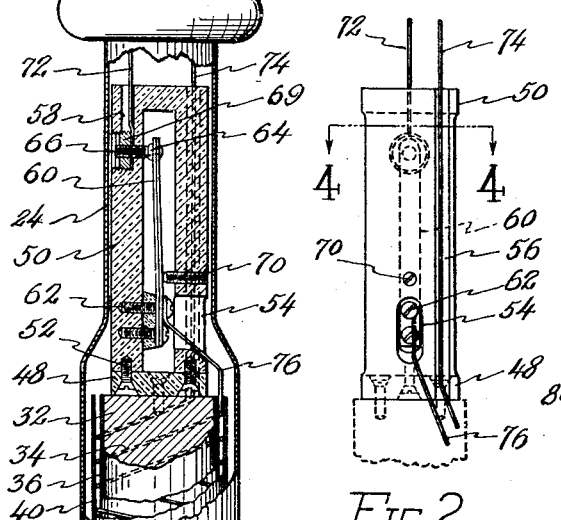
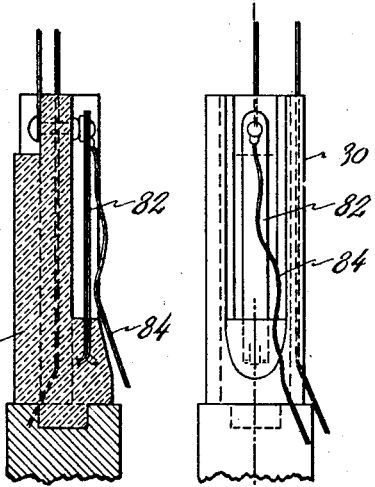
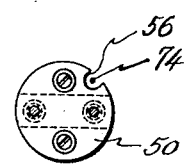
INVENTOR
EDMUND B. MOORE
BY
ATTORNEY Patented Dec. 7, 1937

2,101,445

UNITED STATES PATENT OFFICE 2,101,445

AUTOMATIC CONSTANT HEAT ELECTRIC SOLDERING IRON

Edmund B. Moore, Brooklyn, N. Y.

Application June 21, 1934, Serial No. 731,634

6 Claims. (Cl. 219—26)

My invention relates to new and useful improvements in electrically heated soldering irons.

The range of temperature within which solder can be satisfactorily worked is definitely limited. Once the heat drops below this range or band, or rises above it, a proper fusing of the metal is prevented. If too cold, the solder will not melt and flow, and if too hot, the thin tin film on the copper tip quickly deteriorates, making perfect soldering in either case impossible. For safe, efficient and rapid soldering, as well as for long life of the soldering iron, it is most desirable that the temperature of the tip be kept, insofar as possible, at a pre-selected constant, or at least within that heat range or limit found by experience to be most efficient.

An object of the invention is to incorporate in an electrically heated soldering iron, means for automatically regulating the heating effect of the tool by the temperature of the heater unit.

A further object of the invention is to obtain automatic heat regulation without unduly complicating the structure of the soldering iron.

Other objects and advantages of the invention will be hereinafter pointed out.

In the drawing:

Fig. 1 is a plan view, partly in section, of a soldering iron of the type herein referred to;

Fig. 2 is a side elevation of the core or filler within which the thermostat control is annexed;

Fig. 3 is an end view of the core or filler;

Fig. 4 is a section on the line 4—4 of Fig. 2;

Fig. 5 is a view similar to Fig. 3—viewed from the opposite end;

Fig. 6 is a view similar to Fig. 2 illustrating a modification;

Fig. 7 is an end view of the modified form of core or filler illustrated in Fig. 6;

Fig. 8 is a section on the line 8—8 of Fig. 6; and

Figs. 9 and 10 are fragmentary views showing alternative ways of anchoring a thermostat such as that illustrated in Fig. 6.

In Figs. 1 to 5, inclusive, a soldering iron of more or less conventional appearance is illustrated. It comprises a copper soldering tip 20, a head portion 22, a stem or shank portion 24, and a handle 26. Extending from the outer end of the handle 26 is an electrical conductor cord 28, provided with a cord protector spring 30. If desired, instead of a copper soldering tip such as that indicated at 20, other tip forms designed to perform other and divers operations may be substituted.

The head portion 22 consists of a copper core 32 about which is wound a helix element 34 insulated from the core by mica 36 and from the outer metal casing 38 by mica 40. Preferably, the copper tip 20 is threaded as at 42 to the head portion 22 of the iron, and the complete assembly fastened to the protector casing 38 by the set screws 44.

To the inner end of the core 32 is fastened as at 46 one part 48 of a two-part heat resisting insulating filler, the other part of which is designated as 50. Said two parts 48 and 50 are fastened together as indicated at 52 so that the filler assembly, in production, may be more conveniently manufactured and assembled. The filler part 50 is made hollow, as shown, and has formed therein a side wall opening 54, a side wall groove 56, and an inner end passage or recess 58. Like the core 32, the filler assembly is completely enclosed in the outer protector casing 38, and the latter, as shown, is shaped to accommodate both parts or portions of the complete assembly.

Within the hollow of the filler part 50 is mounted a thermostatic bi-metallic strip 60. Said strip extends lengthwise the filler and is fastened to it at one end as indicated at 62. At its opposite end said strip carries a tungsten or platinum electric contact member 64 adapted for movement into and out of contact with a similar electrical contact member 66 fastened to the filler and extended into the recess 58.

The contact 68, it will be noted, is mounted on a screw 69, adjustable from without the casing 38, whereas the contact member 66 is mounted at the movable end of the thermostat. To insure contact between the elements 64 and 66 under normal heat conditions, a set screw 70 is provided.

One lead 72 of the conductor 28 is fastened to the adjusting screw 69 by its fitting engagement in the recess 58. The other lead 74 of said cord follows along the side wall groove 56 of the filler and is fastened directly to one terminal of the heater coil 34. The other terminal of the coil 34 is electrically connected to the thermostat by a lead 76 carried through the side wall opening 54. Thus organized, it will be seen that the electrical circuit necessary to the operation of the iron is completed.

At room temperature, the member 64 is in firm contact with the member 66. So long as such contact is maintained, heat is generated in the head portion 22 of the iron and transferred by the intimate thermal contact between the core and tip to the latter until a satisfactory working temperature is reached. So long as this satisfactory working temperature is maintained, the iron can be used efficiently. Should the temperature of the head portion build up to a point without or above the desired temperature band or range, an automatic break in the electrical circuit is at once effected.

Both the heater coil and the thermostat are commonly encased in the outer or protector casing 38. The thermostat, therefore, is subject to the same or substantially the same temperatures as the head portion. As the temperature of the thermostat varies, it will automatically effect the thermostat. A higher-than-required temperature will cause it to buckle or bend in a direction tending to break contact between the members 64 and 66, whereas a lower-than-required temperature will cause it to reversely bend and maintain or reestablish (as the case may be) the necessary contact. So long as contact is maintained, heat is generated. If contact is broken, no current flow to the heater coil can occur. The action in each instance is wholly automatic and requires no attention on the part of the operator once the adjusting screw 70 is properly set.

It is also important that the time lag be as small as possible in the functioning of the thermostat. For this reason, the filler is placed closely adjacent to the copper core and the thermostat is made an actual part of the electrical circuit. As a result, the resistance offered by the thermostat itself to the passage of current therethrough tends to raise its temperature simultaneously and parallel with the heating of the heater unit.

In the modification of Figs. 6 to 8, inclusive, a somewhat different arrangement is disclosed. The filler 80, instead of comprising two parts, is made as a one-piece filler. Its relation to the iron, however, is exactly the same. The thermostat 82 is embedded at one end in the material of the filler and forms no actual part of the electrical circuit. In the modified arrangement, the electrical current flows directly through the contact at the end of the thermostat and thence by way of the lead 84 to the heater coil. Except for such minor differences, however, the device of Figs. 6 to 8, inclusive, is substantially the same as the device of Fig. 1. In both instances, the thermostat is in effect a cantilever designed to bend or buckle according to variations in temperature occurring within the enclosing casing and to which the thermostat is itself exposed.

Figs. 9 and 10 show other alternative ways of fastening the thermostat. In Fig. 9 the thermostat 90 is shown embedded in the copper core 92, whereas in Fig. 10 it is shown seated in a recess 94 formed in the core and filled with insulating material. In other respects, the thermostat of Figs. 9 and 10 is the same as the thermostat of Figs. 6 to 8, inclusive.

From the above it will be noted that the space or opening for the thermostat is formed in a suitable filler and completely encased within the steel casing 38 constituting the shank or stem of the soldering iron. Thus encased, the thermostat is at all times subject to the heat of the iron and its movement made automatic and directly responsive to changes in tool temperatures. Moreover, as the automatic control is in itself a complete assembly, existing types of electrically heated soldering irons may be so equipped for constant heat control by merely inserting in the shank or stem of the tool one or another of the forms of thermostatic control suggested.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In an electrically heated tool, a handle, a heat-retaining hollow body including a head portion and a stem portion, said stem portion at one end being fastened to said handle, a heater unit enclosed within said head portion, a work tip carried by said heater unit and extended without said hollow body, a filler of insulating material enclosed within said stem portion, and a thermostat extending lengthwise of said filler adapted to make and break the electrical circuit of which said heater unit forms a part, said thermostat being spaced from said heater unit at such a distance as to maintain an elevated temperature in the thermostat substantially equal to one-half of the elevated temperature at which said heater unit normally operates.

2. In an electrically heated soldering iron, a handle, a heat retaining hollow body including a head portion and a stem portion, said stem portion at one end being fastened to said handle, a heater unit enclosed within said head portion, a soldering tip carried by said heater unit and extending at one end without said hollow body, a filler of insulating material enclosed within said stem portion and fastened at one end to said heater unit, a contact member carried by said filler, and a thermostat including a bi-metallic strip anchored within said filler, said thermostat being adapted to make and break the electrical circuit of which said heater unit forms a part by its movement into and out of engagement with said contact member.

3. In an electrically heated soldering iron, a hollow housing including a stem and a head, a metallic mass within said head having an electric heating element, a soldering tip attached to said mass and projecting without said head, and a bi-metal thermostat switch attached to said mass and extending therefrom within said stem, said thermostat switch and tip lying in equivalent thermal relationship with said mass at opposite ends thereof, and connections between said switch and said electric heating element by which closure of said switch energizes said element.

4. In an electrically heated hand tool, a hollow housing, a metallic mass having an electric heating element within and toward an end of said housing, a work tip attached to the outer end of said mass, in intimate thermal contact therewith and extending from said housing, and a bi-metal thermostatic switch in circuit with said electric heating element attached to and extending without said mass, but disposed within said housing, said thermostat having a thermal relationship with said mass substantially equivalent to the thermal relationship of said work tip with said mass.

5. In an electrically heated device, a metallic mass having an electric heating element for maintaining said mass at a temperature substantially greater than the temperature to be applied to an element to be heated, a work tip carried by said mass and extending therefrom and having thermal contact therewith, and a bi-metal thermostat switch device, in circuit with said heating element, attached to and extending from said mass, said thermostat having thermal contact with said mass, said thermostat, by its extension from said mass, being responsive to temperature changes in, but operating at a substantially reduced temperature from, said mass.

6. In an electrically heated hand tool adapted to operate at temperatures in excess of those at which normal bi-metal thermostats are operative, a metallic mass having an electric heating element, a bi-metal thermostat switch in thermal contact with said mass but relatively remote therefrom, said switch forming a part of the heating element circuit, and said bi-metal thermostat, by its relation to said mass, maintaining, in operation, a lower temperature than said mass, but being responsive to temperature changes thereof.

EDMUND B. MOORE.